US008948519B2

(12) United States Patent
Sakurai

(10) Patent No.: US 8,948,519 B2
(45) Date of Patent: Feb. 3, 2015

(54) LINEAR MARK DETECTION SYSTEM, LINEAR MARK DETECTION METHOD, AND NON-TRANSITORY COMPUTER READABLE MEDIUM STORING LINEAR MARK DETECTING PROGRAM

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 157 days.

(21) Appl. No.: 13/636,050

(22) PCT Filed: Dec. 16, 2010

(86) PCT No.: PCT/JP2010/007303

§ 371 (c)(1),
(2), (4) Date: Sep. 19, 2012

(87) PCT Pub. No.: WO2011/117950

PCT Pub. Date: Sep. 29, 2011

(65) Prior Publication Data

US 2013/0004084 A1    Jan. 3, 2013

(30) Foreign Application Priority Data

Mar. 23, 2010   (JP) .................................. 2010-066580

(51) Int. Cl.
G06K 9/46      (2006.01)
B60W 30/12     (2006.01)
G06K 9/00      (2006.01)
(Continued)

(52) U.S. Cl.
CPC ........... B60W 30/12 (2013.01); G06K 9/00798 (2013.01); G06T 7/0085 (2013.01); G08G 1/167 (2013.01); G06T 2207/10016 (2013.01); G06T 2207/30256 (2013.01)
USPC .......................................... 382/202; 382/104

(58) Field of Classification Search
None
See application file for complete search history.

(56) References Cited

U.S. PATENT DOCUMENTS 6,591,000 B1 *   7/2003   Oike et al. ..................... 382/104
6,813,383 B1 *   11/2004  Sakurai ......................... 382/202
(Continued)

FOREIGN PATENT DOCUMENTS

JP    2000-057351    2/2000
JP    2003-178399    6/2003
(Continued)

OTHER PUBLICATIONS

Huang, Albert S., et al. "Finding multiple lanes in urban road networks with vision and lidar." Autonomous Robots 26.2-3 (2009): 103-122.*

(Continued)

Primary Examiner — Nirav G Patel
Assistant Examiner — Geoffrey E Summers
(74) Attorney, Agent, or Firm — Young & Thompson

(57) ABSTRACT

A linear mark detection system includes a filter value calculation unit, a filter value threshold processing unit, and a feature value output unit. The filter value calculation unit calculates, for each pixel of an image, filter values corresponding to each of a plurality of linear mark widths using pixel values inside and outside the linear mark. The filter value threshold processing unit selects the most suitable value from filter values corresponding to each of the plurality of linear mark widths as a feature value. The feature value output unit outputs, for each pixel of the image, the feature value computed by the filter value threshold processing function as the feature value corresponding to the linear mark.

9 Claims, 12 Drawing Sheets

(51) Int. Cl.
*G06T 7/00* (2006.01)
*G08G 1/16* (2006.01)

(56) References Cited

U.S. PATENT DOCUMENTS

2010/0080467 A1 4/2010 Sakurai
2010/0284569 A1 11/2010 Sakurai

FOREIGN PATENT DOCUMENTS

| JP | 2008-123036 | 5/2008 |
| JP | 2008-225953 | 9/2008 |
| JP | 2009-169510 | 7/2009 |

OTHER PUBLICATIONS

Veit, Thomas, et al. "Evaluation of road marking feature extraction." Intelligent Transportation Systems, 2008. ITSC 2008. 11th International IEEE Conference on. IEEE, 2008.*

International Search Report, PCT/JP2010/007303, Jan. 18, 2011.

* cited by examiner

LINEAR MARK DETECTION SYSTEM, LINEAR MARK DETECTION METHOD, AND NON-TRANSITORY COMPUTER READABLE MEDIUM STORING LINEAR MARK DETECTING PROGRAM

TECHNICAL FIELD

The present invention relates to a linear mark detection system, a linear mark detection method, and a non-transitory computer readable medium storing a linear mark detecting program, and more specifically, a linear mark detection system, a linear mark detection method, and a non-transitory computer readable medium storing a linear mark detecting program capable of detecting a linear mark having different widths.

BACKGROUND ART

In recent years, techniques for detecting linear marks have been disclosed. The linear mark here means, as shown in FIG. 7, for example, a mark of a width of a white line or the like which is a kind of a lane line drawn on a road surface. PTL 1 discloses a technique related to a linear mark detector for detecting a white line in a road image.

FIG. 11 shows a configuration of a system including the linear mark detector disclosed in PTL 1. This system includes a road image input apparatus 910, a white-line image width determining unit 901, a white-line inside/outside luminance difference computing unit 902, a white-line end edge intensity computing unit 903, a white-line internal luminance uniformity computing unit 904, a white-line feature integrating unit 905, and a white-line feature point data output unit 906. An operation of the system will be described below.

The road image input unit 910 inputs a road image. The white-line image width determining unit 901 determines a width of an image at each point on a road image based on its ordinate in the case where a white-line image exists on the point. The white-line inside/outside luminance difference computing unit 902 computes a difference in luminance value between the inside and the outside of a white-line region based on a position and a width of the white-line image, the width being determined at each point on the road image by the white-line image width determining unit 901. The white-line end edge intensity computing means 903 computes edge intensity at an end of a white line based on a width of the white-line image, the width being determined at each point on the road image by the white-line image width determining unit 901.

The white-line internal luminance uniformity computing unit 904 computes uniformity of luminance in a white line based on a width of the white-line image, the width being determined at each point on the road image by the white-line image width determining unit 901. The white-line feature integrating unit 905 integrates feature values computed by the white-line inside/outside luminance difference computing unit 902, the white-line end edge intensity computing means 903, and the white-line internal luminance uniformity computing means 904 to give an evaluation value indicative of a likelihood of a white-line feature point to each point in the road image. The white-line feature point data output unit 906 outputs the evaluation value.

CITATION LIST

Patent Literature

PTL 1: Japanese Unexamined Patent Application Publication No. 2000-057351

PTL 2: Japanese Unexamined Patent Application Publication No. 2009-169510

PTL 3: Japanese Unexamined Patent Application Publication No. 2008-123036

SUMMARY OF INVENTION

Technical Problem

However, the linear mark detector disclosed in PTL 1 has the following problem. In this linear mark detector, the width of the linear mark which is to be detected is fixed in advance. In short, the linear mark detector only detects a linear mark having a predetermined width. The linear mark detector computes the evaluation value stated above based on the predetermined width of the linear mark. Accordingly, there is a problem that some linear mark detection systems are able to detect only the linear mark having a single width for one image.

The present invention has been made in order to solve the problem stated above, and one main exemplary object of the present invention is to provide a linear mark detection system, a linear mark detection method, and a non-transitory computer readable medium storing a linear mark detecting program that are capable of detecting a linear mark having different widths.

Solution to Problem

An exemplary aspect of a linear mark detection system according to the present invention includes: filter value calculation means for calculating, for each pixel of an image, filter values corresponding to each of a plurality of linear mark widths using pixel values inside and outside a linear mark; filter value threshold processing means for setting a most suitable value to a feature value from the filter values corresponding to each of the plurality of linear mark widths; and feature value output means for outputting, for each pixel of the image, the feature value as a feature value corresponding to the linear mark.

An exemplary aspect of a linear mark detection method according to the present invention includes: calculating, for each pixel of an image, filter values corresponding to each of a plurality of linear mark widths using pixel values inside and outside a linear mark; setting a most suitable value to a feature value from the filter values corresponding to each of the plurality of linear mark widths; and outputting, for each pixel of the image, the feature value as a feature value corresponding to the linear mark.

An exemplary aspect of a non-transitory computer readable medium storing a linear mark detection program according to the present invention is a non-transitory computer readable medium storing a program for causing a computer to execute detection processing to detect a linear mark, in which the detection processing comprises processing of: calculating, for each pixel of an image, filter values corresponding to each of a plurality of linear mark widths using pixel values inside and outside the linear mark; setting a most suitable value to a feature value from the filter values corresponding to each of the plurality of linear mark widths; and outputting, for each pixel of the image, the feature value as a feature value corresponding to the linear mark.

Advantageous Effects of Invention

According to the present invention, it is possible to provide a linear mark detection system, a linear mark detection method, and a non-transitory computer readable medium storing a linear mark detecting program that are capable of detecting a linear mark having different widths.

DESCRIPTION OF EMBODIMENTS

First Exemplary Embodiment

Figure 1:
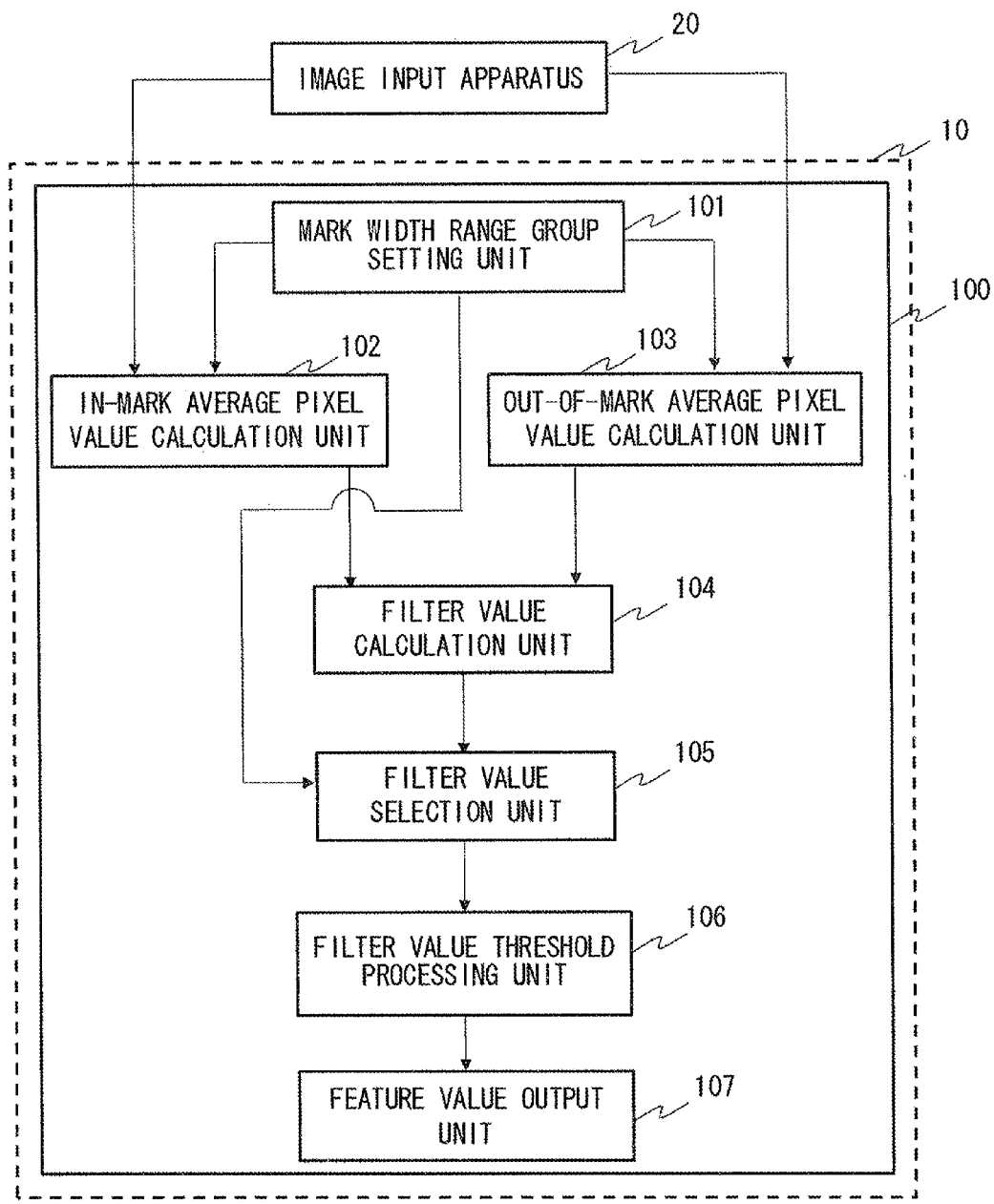
FIG. 1 is a block diagram showing a whole configuration of a linear mark detection system according to a first exemplary embodiment.

In the following description, with reference to the drawings, exemplary embodiments of the present invention will be described. FIG. 1 is a block diagram showing a configuration of a system according to linear mark detection according to this exemplary embodiment. This system includes a computer 10 and an image input apparatus 20.

The image input apparatus 20 is an apparatus to capture an image of which linear mark is to be detected.

Figure 2:
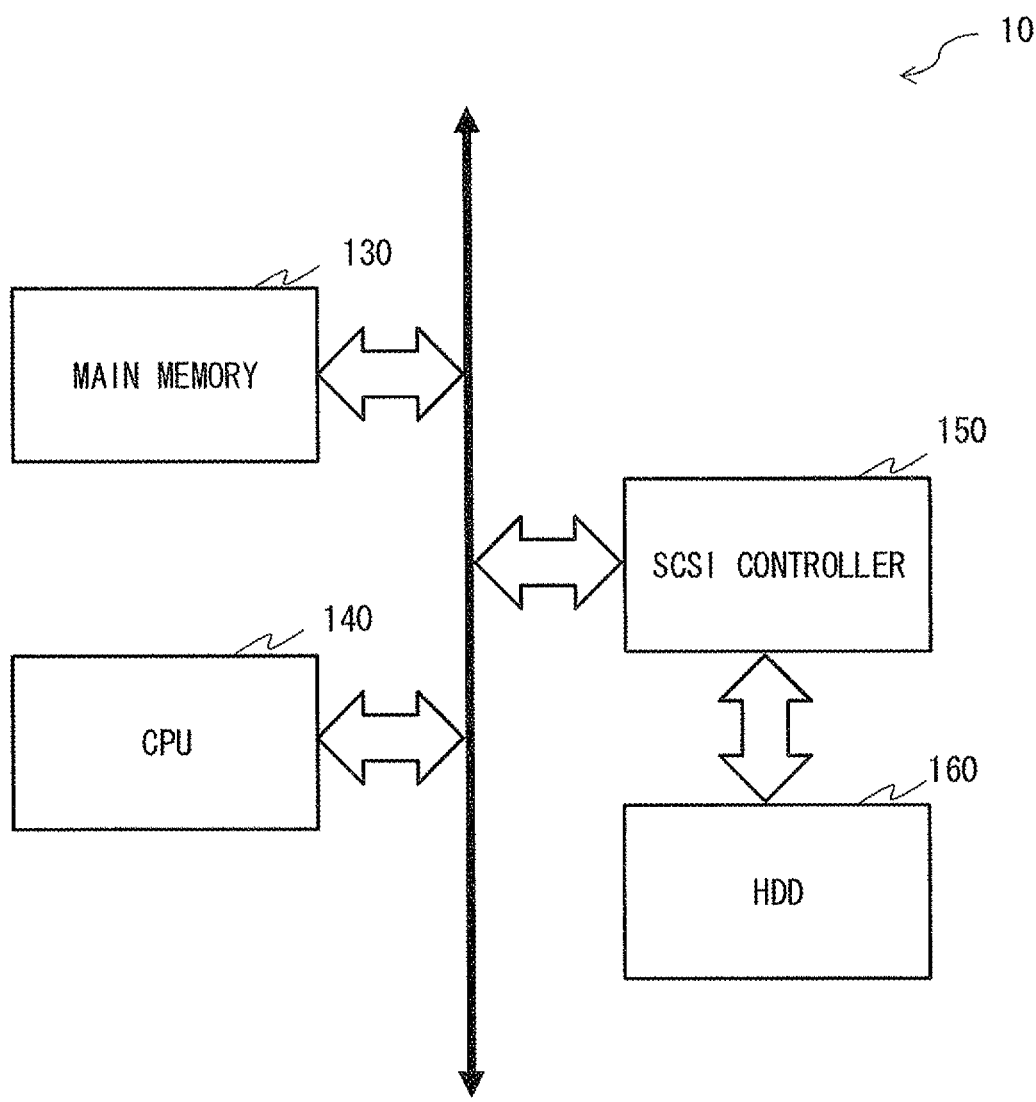
FIG. 2 is a block diagram showing a configuration of a computer according to the first exemplary embodiment.

The computer 10 is a calculator including a central processing unit (CPU). FIG. 2 shows a configuration example of the computer 10. The computer 10 includes, for example, a main memory 130, a CPU 140, an SCSI controller 150, and an HDD 160. In the following description, the linear mark detection system 100 will be described as software achieved by causing the CPU 140 to execute a computer program. The linear mark detection system 100 includes a mark width group setting unit 101, an in-mark average pixel value calculation unit 102, an out-of-mark average pixel value calculation unit 103, a filter value calculation unit 104, a filter value selection unit 105, a filter value threshold processing unit 106, and a feature value output unit 107. The outline of an operation of each processing unit will be described below.

The mark width group setting unit 101 is a processing unit for setting a linear mark width range group in which a width of a linear mark (hereinafter also referred to as a linear mark width) is divided into a plurality of ranges. For example, the mark width group setting unit 101 sets a plurality of range groups so that the range of the linear mark width may be divided into 20 cm-50 cm, 50 cm-70 cm, 70 cm-200 cm, for example. Each range of the linear mark width range group includes a plurality of linear mark widths. For example, the linear mark width range 20 cm-50 cm includes 20 cm, 25 cm, 30 cm, 35 cm, 40 cm, 45 cm, which are linear mark widths for every 5 cm. The mark width group setting unit 101 outputs the mark width range group that is set to the in-mark average pixel value calculation unit 102 and the out-of-mark average pixel value calculation unit 103.

The in-mark average pixel value calculation unit 102 assumes that each pixel 203 is a pixel that exists in right or left end of the linear mark, and computes, from the pixel position, an average value (in-mark average pixel value) of pixel values of luminance values or the like in the region in each linear mark width (e.g., 20 cm, 25 cm, 30 cm, or the like) of the linear mark width range (e.g., 20 cm-50 cm). The in-mark average pixel value calculation unit 102 outputs the in-mark average pixel value that is computed to the filter value calculation unit 104.

Figure 3:
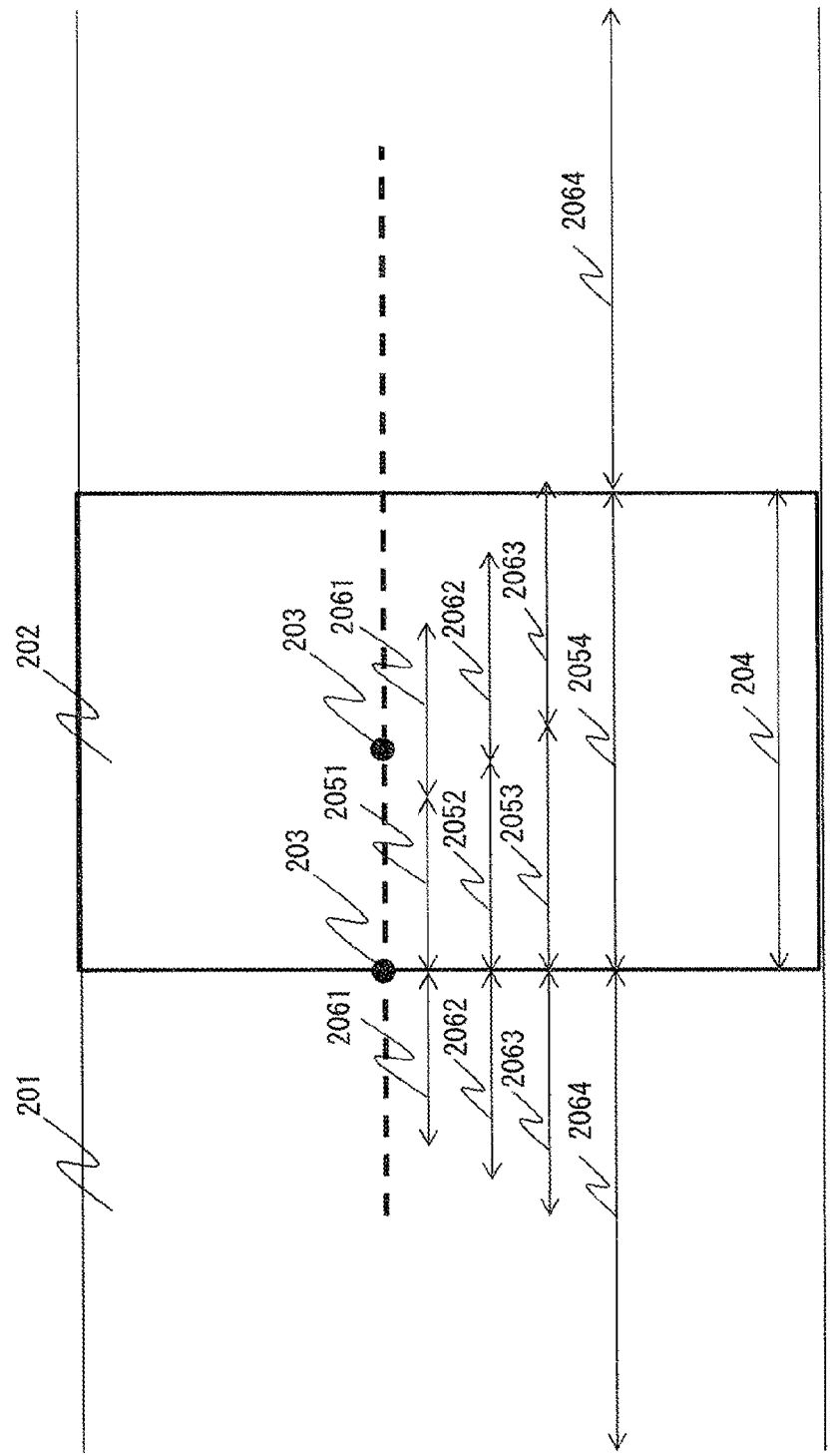
FIG. 3 is a diagram of an image of a linear mark that is to be detected by the linear mark detection system according to the first exemplary embodiment.

The out-of-mark average pixel value calculation unit 103 computes, for each pixel 203, an average value (out-of-mark average pixel value) of pixel values of luminance values or the like in the regions that exist in right and left outer sides of the region to compute the average value set by the in-mark average pixel value calculation unit 102. The out-of-mark average pixel value calculation unit 103 outputs the out-of-mark average pixel value that is computed to the filter value calculation unit 104. With reference to FIG. 3, operations of the in-mark average pixel value calculation unit 102 and the out-of-mark average pixel value calculation unit 103 will be described.

FIG. 3 shows an image of a linear mark. FIG. 3 shows a region 201 outside the linear mark, and a linear mark 202 including a linear mark width 204.

The in-mark average pixel value calculation unit 102 assumes that the pixel to be calculated is located in one of right and left ends of the linear mark 202, and computes, from the pixel position, the average value of pixel values of luminance values or the like in the region of each linear mark width 205n (n is a natural number of one or larger) of the linear mark width range (e.g., 20 cm-50 cm).

The out-of-mark average pixel value calculation unit 103 computes an average value of pixel values of luminance values or the like in the regions of 206n (n is a natural number of one or larger) which are in right and left sides of the region of each linear mark width 205n.

The filter value calculation unit 104 is a processing unit for computing a filter value using the in-mark average pixel value and the out-of-mark average pixel value. For example, the filter value calculation unit 104 sets a value obtained by subtracting the out-of-mark average pixel value from the in-mark average pixel value as the filter value. In this operation, when the subtracted value is smaller than 0, the filter value is set to 0. The filter value calculation unit 104 computes the filter value for each linear mark width (e.g., 20 cm, 25 cm, 30 cm, or the like) in the range of each linear mark width (e.g., 20 cm-50 cm, 50 cm-70 cm, 70 cm-200 cm). The filter value calculation unit 104 outputs the filter values that are computed to the filter value selection unit 105. The filter value calculation unit 104 executes the computing processing of this filter value for each pixel 203.

The filter value selection unit 105 selects, for the range of each linear mark width (e.g., 20 cm-50 cm, 50 cm-70 cm, 70 cm-200 cm), the optimal filter value from the filter value of each linear mark width in the range. For example, the filter value selection unit 105 selects the filter value having the maximum value in the range. The filter value selection unit 105 outputs the optimal filter value in each range (hereinafter also referred to as an optimal filter value) to the filter value threshold processing unit 106.

The filter value threshold processing unit 106 compares the optimal filter value in the range of each linear mark width (e.g., 20 cm-50 cm, 50 cm-70 cm, 70 cm-200 cm) with a predetermined threshold. The filter value threshold processing unit 106 sets the optimal filter value which is equal to or larger than the threshold and corresponds to the smallest linear mark width as a feature value. The filter value threshold processing unit 106 computes the feature value of each pixel. The filter value threshold processing unit 106 outputs the feature value of each pixel 203 that is computed to the feature value output unit 107. Note that the threshold is empirically determined according to the type of the image which is to be detected, for example.

The feature value output unit 107 is a processing unit that outputs the feature value for each pixel to a desired apparatus or the like.

Note that the image input apparatus 20 may supply the image which was subjected to filtering processing, geometric transform or the like to the computer 10.

Further, in the processing for computing the filter values and the processing for selecting the optimal filter value, the filter values may be computed in order from the range corresponding to the smaller linear mark width among the linear mark width range group, and when the optimal filter value in one linear mark width range is equal to or larger than the threshold, this optimal filter value may be set to the feature value. In this case, the calculation of the filter value is interrupted when the optimal filter value that exceeds the threshold is computed.

Further, in the calculation of the filter values, gradient values of pixel values in both ends of the linear mark 202, uniformity of the pixel value in the linear mark 202 and the like may also be considered in addition to the in-mark average pixel value and the out-of-mark average pixel value.

While the linear mark detection system 100 will be described as software that is achieved by causing a CPU to execute a computer program, a part or all of the functions may be achieved as hardware. The program mentioned above can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
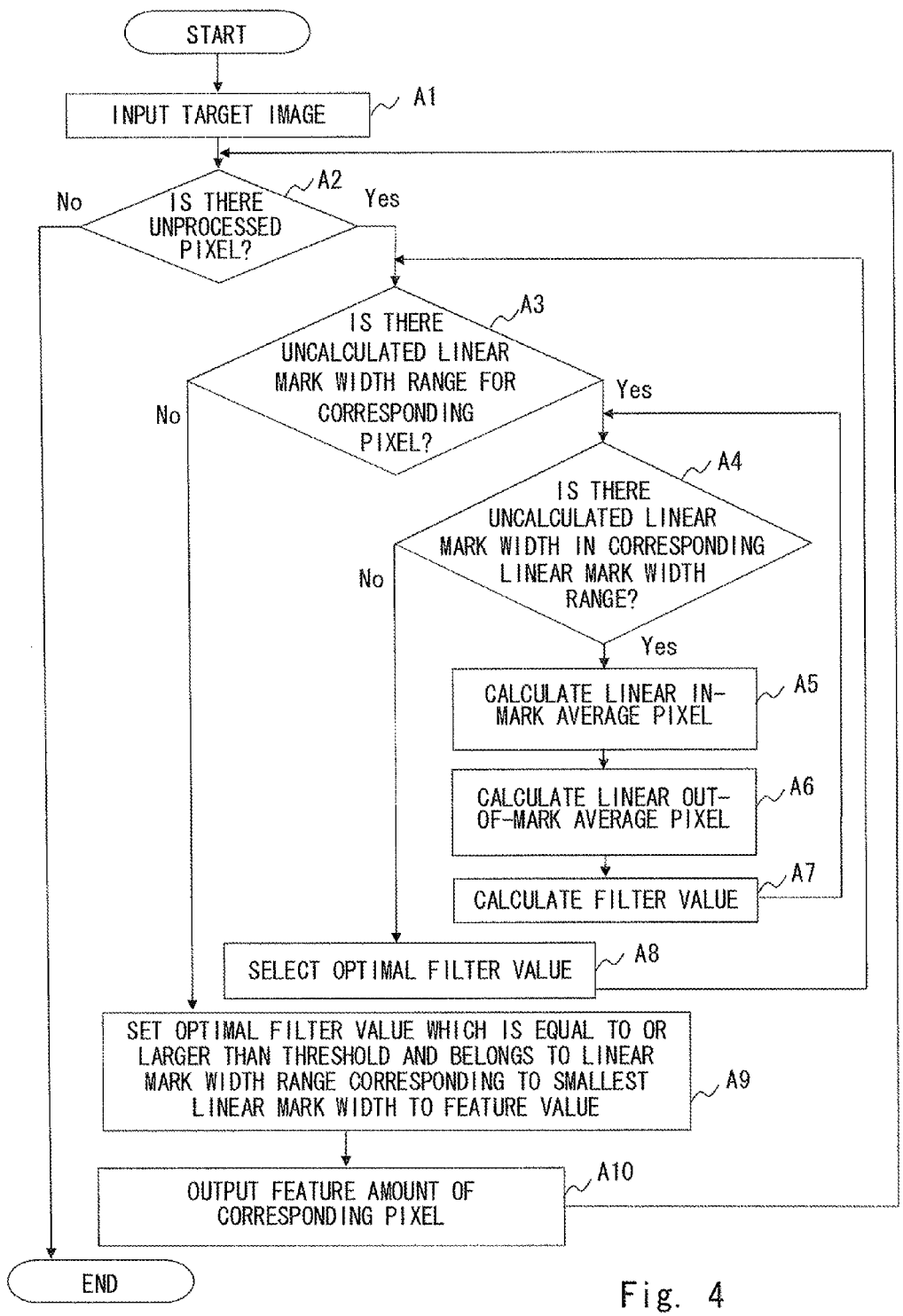
FIG. 4 is a flowchart showing an operation of the linear mark detection system according to the first exemplary embodiment.

Subsequently, with reference to FIGS. 1, 3, and 4, an operation of the linear mark detection system 100 according to this exemplary embodiment will be described. FIG. 4 is a flowchart showing an operation of the linear mark detection system 100 according to this exemplary embodiment.

First, the image input apparatus 20 inputs an image to be processed that is captured (A1). Subsequently, the in-mark average pixel value calculation unit 102 determines whether there is an unprocessed pixel (A2). When there is no unprocessed pixel (A2: No), the linear mark detection system 100 ends the processing.

When there is an unprocessed pixel (A2: Yes), the linear mark detection system 100 determines if there is a linear mark width range whose optimal filter value is uncalculated among the linear mark width range group set by the mark width group setting unit 101 in the pixel to be processed (A3).

When there is a linear mark width range whose optimal filter value is uncalculated (A3: Yes), the linear mark detection system 100 determines whether there is a linear mark width whose filter value is uncalculated in the linear mark width range (A4).

When there is a linear mark width whose filter value is uncalculated in the linear mark width range (A4: Yes), the in-mark average pixel value calculation unit 102 computes the in-mark average pixel value regarding the pixel (A5). Further, the out-of-mark average pixel value calculation unit 103 computes the out-of-mark average pixel value regarding the pixel (A6). Further, the filter value calculation unit 104 computes the filter value from the in-mark average pixel value and the out-of-mark average pixel value (A7).

When there is no more linear mark width whose filter value is uncalculated in the linear mark width range (A4: No), the filter value selection unit 105 selects the optimal filter value for the linear mark width range, e.g., the filter value having the maximum value (A8).

When there is no more linear mark width range whose optimal filter value is uncalculated (A3: No), the filter value threshold processing unit 106 compares the optimal filter value in each of the linear mark width ranges in the linear mark width range group with the threshold (A9). The filter value threshold processing unit 106 sets the optimal filter value which is equal to or larger than the threshold and belongs to the linear mark width range corresponding to the smallest linear mark width to the feature value (A9).

The feature value output unit 107 outputs the feature value computed by the filter value threshold processing unit 106 (A10).

Note that the processing of A1-A10 stated above is achieved by causing a CPU to execute a computer program. However, it is not limited to this. For example, it may be achieved by hardware that performs a part or all of this processing.

Subsequently, an effect of the linear mark detection system according to this exemplary embodiment will be described. The linear mark detection system according to this exemplary embodiment detects the linear mark assuming a plurality of different linear mark widths instead of a single linear mark width. Accordingly, even when there is a linear mark having different widths in an image to be detected, the linear mark detection system is able to detect each linear mark.

Further, the linear mark detection system according to this exemplary embodiment divides a linear mark width into a plurality of mark width range groups. As described above, the linear mark detection system according to this exemplary embodiment is configured to compare the filter values with the threshold in order from the range group corresponding to the linear mark width, and when the threshold is exceeded, the linear mark detection system does not consider the filter values in the range larger than this range. Accordingly, even when there are a plurality of linear marks that are close together in an image, it is possible to detect the plurality of linear marks. In summary, according to the linear mark detection system of this exemplary embodiment, even when there are a plurality of linear marks that are close together, it is possible to prevent such a situation in which the plurality of linear marks are detected as a large linear mark as a whole. This makes it possible to detect the linear marks more strictly. The detail of the detection of the plurality of linear marks will be described with reference to FIG. 5.

Figure 5:
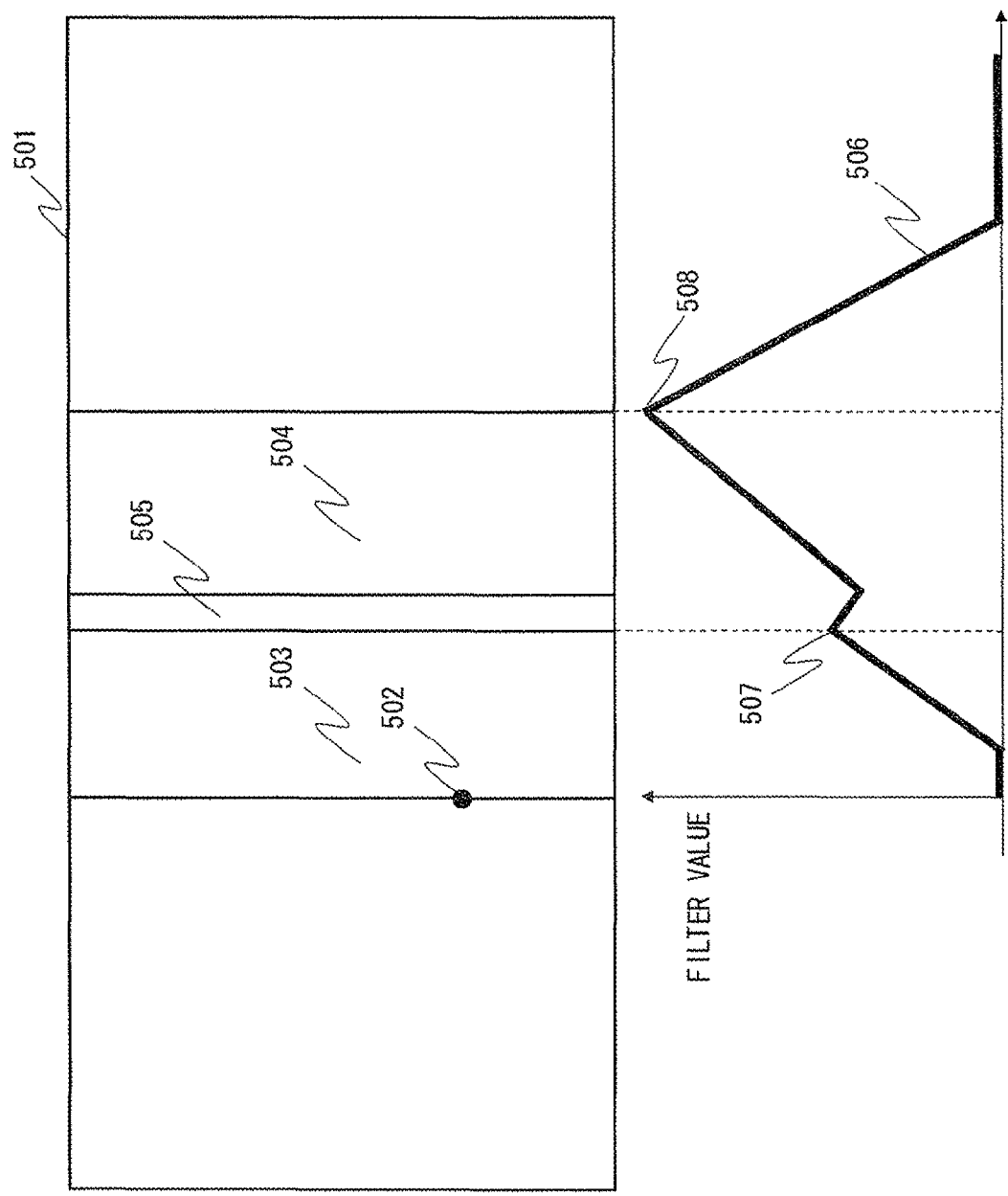
FIG. 5 is a diagram of images of linear marks that are to be detected by the linear mark detection system according to the first exemplary embodiment, and transition of filter values.

FIG. 5 shows an image 501 including two linear marks 503 and 504. Further, there is a narrow interval 505 between the linear marks 503 and 504. Consider a case in which the range group of the linear mark width is not set, as is different from the linear mark detection system according to this exemplary embodiment.

When the range group of the linear mark width is not set, in a filter value 506, a filter value 508 is larger than a filter value 507 in the original linear mark width. The filter value 508 is a filter value when the linear mark 503 and the linear mark 504 are regarded as one large linear mark. Thus, it may be erroneously determined that there is only one linear mark.

However, according to the linear mark detection system of this exemplary embodiment, the range of the linear mark width is divided into a plurality of ranges, and filter values and a threshold are compared while putting priority to a smaller range. Accordingly, in the example shown in FIG. 5, the linear mark detection system according to this exemplary embodiment is able to correctly detect two linear marks.

Second Exemplary Embodiment

A second exemplary embodiment according to the present invention has a feature that a linear mark detection system is applied to detection of a lane line. First, with reference to FIGS. 6 and 7, operation images of a system including a linear mark detection system according to this exemplary embodiment will be described. This system operates as a drive assist system for performing drive assist of a driver of a vehicle.

Figure 6:
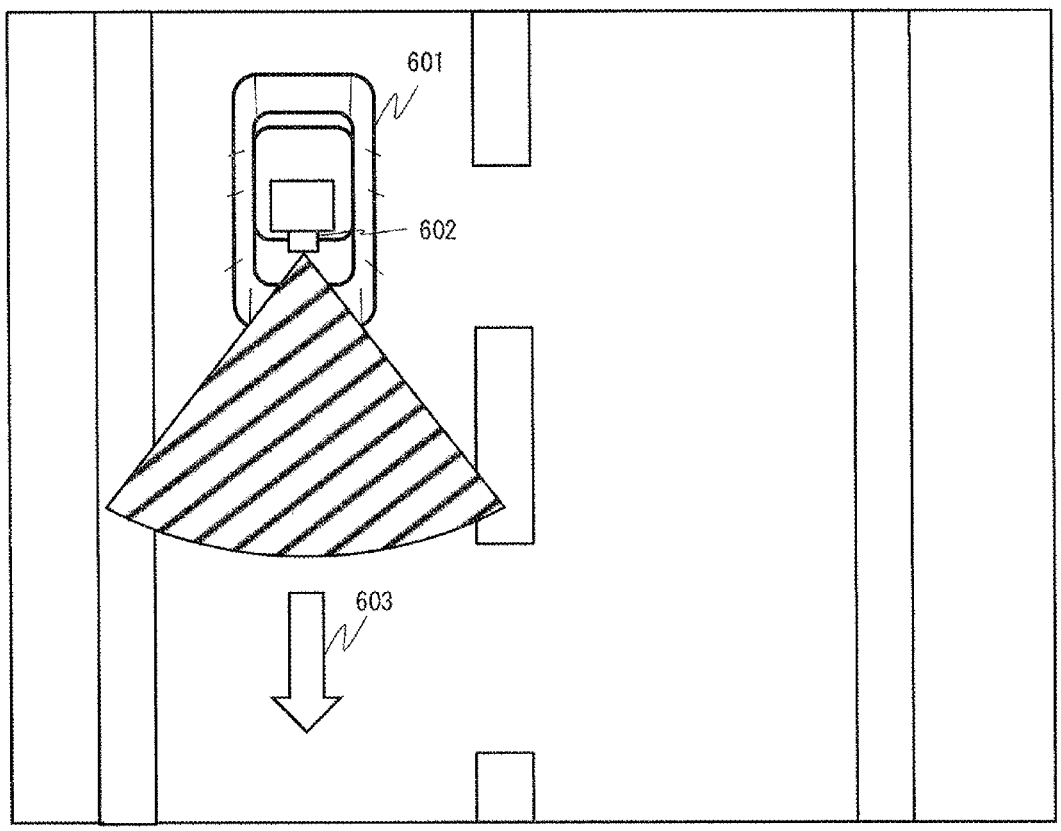
FIG. 6 is a conceptual diagram showing the outline of a drive assist system according to a second exemplary embodiment.
Figure 7:
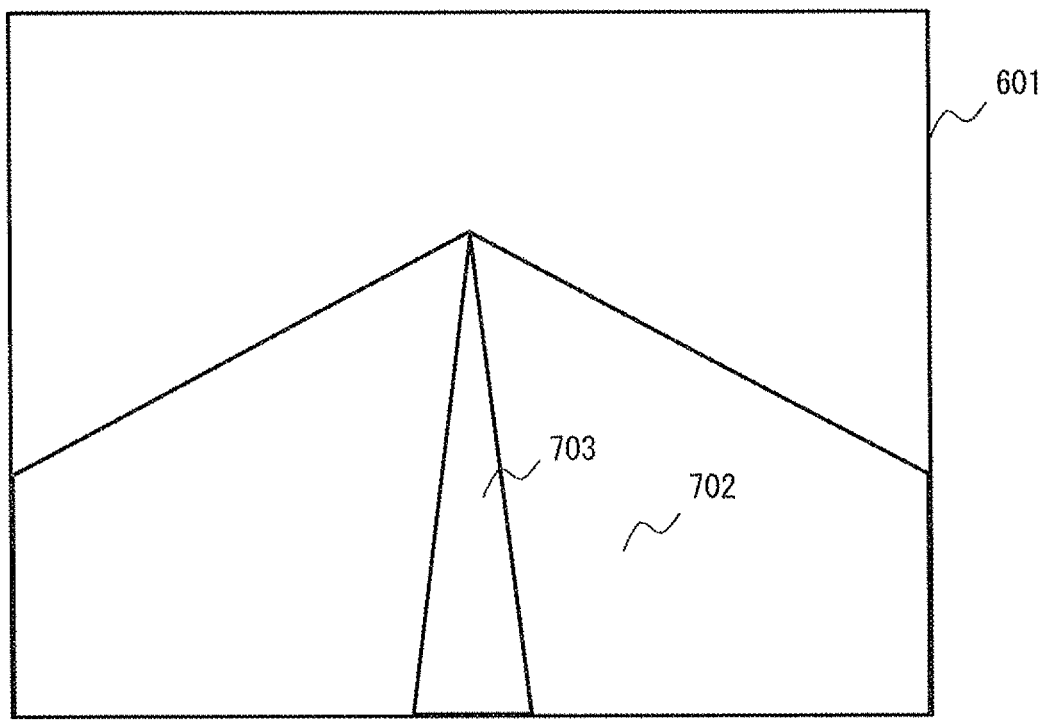
FIG. 7 is a diagram of a road image which is to be detected by a linear mark detection system according to the second exemplary embodiment.

FIG. 6 is a diagram showing an example of applying the linear mark detection system according to this exemplary embodiment. FIG. 6 shows an own vehicle 601 that travels on the road. A camera 602 which is installed to capture the same direction as a travelling direction 603 is attached to the own vehicle 601. The camera 602 is a processing unit that serves as an image input apparatus to input images to the linear mark detection system. FIG. 7 shows an example of the image captured by the camera 602. In a road image 701 which is the camera image, a road surface 702 and a white line 703 are captured.

The linear mark detection system (not shown) attached to the own vehicle 601 detects the white line 703 which is a kind of a lane line that exists on the road surface 702 of the road image 701 captured by the camera 602. Further, the linear mark detection system calculates the position of the white line 703, and detects whether there is a possibility that the own vehicle 601 departs from the own lane based on this position. When there is a possibility that the own vehicle 601 departs from the own lane, a warning device attached to the own vehicle 601 issues a warning to the driver.

In the following description, the capturing direction by the camera 602, which is the direction in which the white line 703 is provided is denoted by a longitudinal direction, and the direction perpendicular to the direction in which the white line 703 is provided is denoted by a lateral direction. However, the relative relation of the position and the direction is merely an example, and the relative relation of the position and the direction between the linear mark and the camera 602 is not limited to this.

Figure 8:
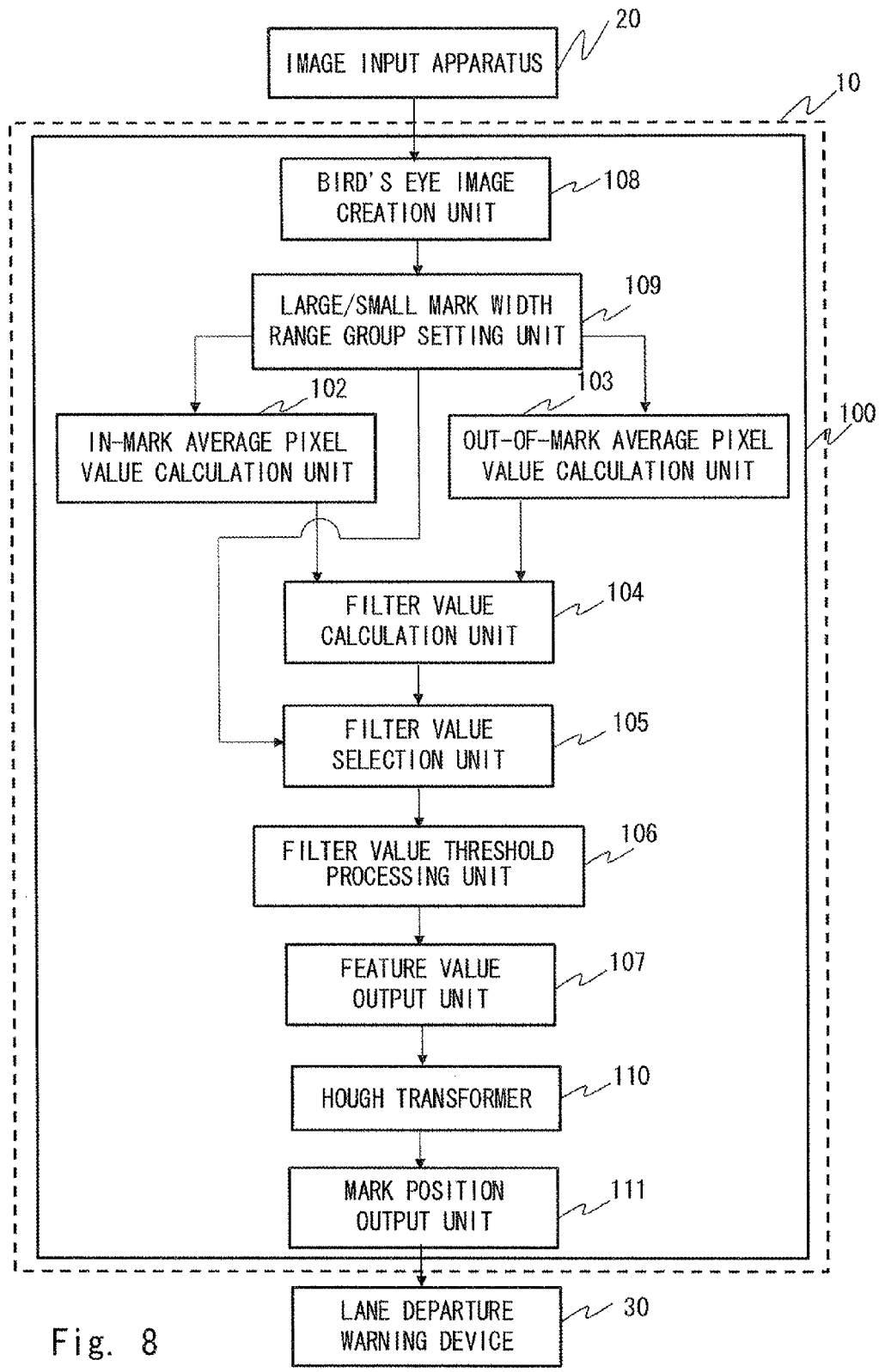
FIG. 8 is a block diagram showing a whole configuration of the linear mark detection system according to the second exemplary embodiment.

Next, with reference to FIG. 8, the outline of the system including the linear mark detection system according to this exemplary embodiment will be described. This system includes a computer 10, an image input apparatus 20, and a lane departure warning device 30. The computer 10 includes a linear mark detection system 100. Note that, in FIG. 8, the processing units denoted by the same names and same reference symbols basically perform the same processing as those in the first exemplary embodiment.

The linear mark detection system 100 includes a bird's eye image creation unit 108, a large/small mark width range group setting unit 109, an in-mark average pixel value calculation unit 102, an out-of-mark average pixel value calculation unit 103, a filter value calculation unit 104, a filter value selection unit 105, a filter value threshold processing unit 106, a feature value output unit 107, a Hough transformer 110, and a mark position output unit 111.

The bird's eye image creation unit 108 is a processing unit for generating a bird's eye image based on the road image input from the image input apparatus 20. See, for example, PTL 2 for the detail of creating the bird's eye image. The bird's eye image creation unit 108 outputs the created image to the large/small mark width range group setting unit 109.

The large/small mark width range group setting unit 109 is a processing unit corresponding to the mark width group setting unit 101 in the first exemplary embodiment. The large/small mark width range group setting unit 109 divides the range of the width that the white line 703 may have in the real world into two large and small ranges and sets the ranges. For example, the large/small mark width range group setting unit 109 sets the smaller mark width range to 10 cm or larger and smaller than 35 cm, and sets the larger mark width range to 35 cm or larger and smaller than 75 cm.

The in-mark average pixel value calculation unit 102 sequentially extracts pixels to be calculated from the image created by the bird's eye image creation unit 108, assumes that the pixel is positioned at one end of right and left ends of the white line 703, and computes, from the pixel position, the average value (in-mark average pixel value) of the pixel values from the luminance values or the like in the region in each linear mark width (e.g., each linear mark width for every 5 cm) of the large and small linear mark width ranges. The in-mark average pixel value calculation unit 102 outputs the in-mark average pixel value of each pixel that is computed to the filter value calculation unit 104.

The out-of-mark average pixel value calculation unit 103 sequentially extracts pixels that are to be calculated from the image created by the bird's eye image creation unit 108, to compute the average value (out-of-mark average pixel value) of the pixel values from the luminance or the like in the right and left regions (e.g., regions having a width of 5 cm) of each mark width set by the in-mark average pixel value calculation unit 102. The out-of-mark average pixel value calculation unit 103 outputs the out-of-mark average pixel value of each pixel that is computed to the filter value calculation unit 104.

The filter value calculation unit 104 sets, for each pixel of the image created by the bird's eye image creation unit 108, a value obtained by subtracting the out-of-mark average pixel value from the in-mark average pixel value as a filter value. When the subtracted value is smaller than 0, the filter value calculation unit 104 sets the filter value of the pixel to 0. The filter value calculation unit 104 outputs the filter value of each pixel that is computed to the filter value selection unit 105.

The filter value selection unit 105 selects, for each pixel of the image created by the bird's eye image creation unit 108, the maximum value from the filter values regarding each mark width for the range of each of large and small linear mark widths as the optimal filter value of the mark width. The filter value selection unit 105 outputs the optimal filter value that is selected (in this exemplary embodiment, optimal filter value corresponding to large and small two range groups) to the filter value threshold processing unit 106.

The filter value threshold processing unit 106 sets, for each pixel of the image created by the bird's eye image creation unit 108, when the optimal filter value according to the smaller mark width range (10 cm or larger and smaller than 35 cm) is equal to or larger than the threshold, the optimal filter value to the feature value of the pixel to be processed. When the optimal filter value according to the smaller mark width range (10 cm or larger and smaller than 35 cm) is smaller than the threshold, the filter value threshold processing unit 106 compares the optimal filter value in the larger mark width range (35 cm or larger and smaller than 75 cm) with the threshold. When the optimal filter value in the larger mark width range (35 cm or larger and smaller than 75 cm) is equal to or larger than the threshold, the filter value threshold processing unit 106 sets this filter value to the feature value of the pixel to be processed. On the other hand, when the optimal filter value in the larger mark width range (35 cm or larger and smaller than 75 cm) is smaller than the threshold, the filter value threshold processing unit 106 sets the feature value of the pixel to be processed to 0. The filter value threshold processing unit 106 outputs the feature value according to each pixel that is computed to the feature value output unit 107.

The feature value output unit 107 outputs the feature value regarding each pixel of the image created by the bird's eye image creation unit 108 to the Hough transformer 110.

The Hough transformer 110 sets, for the image created by the bird's eye image creation unit 108, the pixel to the feature point when the feature value is large than 0. The Hough transformer 110 then detects the straight line formed by the white line 703 using the feature point. The Hough transformer 110 outputs the straight line that is detected to the mark position output unit 111. See PTL 3 as appropriate for the detail of the processing of Hough transform.

The mark position output unit 111 outputs the position of the straight line detected by the Hough transformer 110 to the lane departure warning device 30 as the mark position of the white line 703.

The lane departure warning device 30 is an apparatus for issuing a warning or the like to a driver of the own vehicle 601 according to the positional relation between the own vehicle 601 and the mark position of the white line 703 that is input. The lane departure warning device 30 is attached to the own vehicle 601. The lane departure warning device 30 may be configured so that it can input data to a car navigation system attached to the own vehicle 601.

For example, when the distance between the mark position of the white line 703 that is input and the own vehicle 601 is 30 cm or smaller and a blinker of the own vehicle 601 is not lighted, the lane departure warning device 30 issues a warning of the lane departure to the driver by warning sound. Alternatively, a waning of the lane departure may be issued to the driver by displaying the warning on a monitor of the car navigation system.

Note that the linear mark detection system 100 according to this exemplary embodiment may use an image obtained by performing processing such as filtering processing, geometric transform or the like on the bird's eye image as the image in which the linear mark is to be detected instead of the bird's eye image described above.

Further, in the processing for computing the filter values and the processing for selecting the optimal filter value, the filter values may be computed in order from the range corresponding to the smaller linear mark width among the linear mark width range group, to set the optimal filter value to the feature value when the optimal filter value in one linear mark width range is equal to or larger than the threshold. In this case, the calculation of the filter value is interrupted when the optimal filter value that exceeds the threshold is computed.

Further, when the filter values are calculated, the gradient values of the pixel values in both ends of the white line 703, uniformity of the pixel value in the white line 703 or the like may also be considered in addition to the in-mark average pixel value and the out-of-mark average pixel value. In this case, for example, the filter value calculation unit 104 sets the linear sum of three computed values as the filter value. The three computed values include a difference between the in-mark average pixel value and the out-of-mark average pixel, the sum of gradients of luminance values in both ends of the white line 703, and a variance of the luminance values in the white line 703.

Figure 9A:
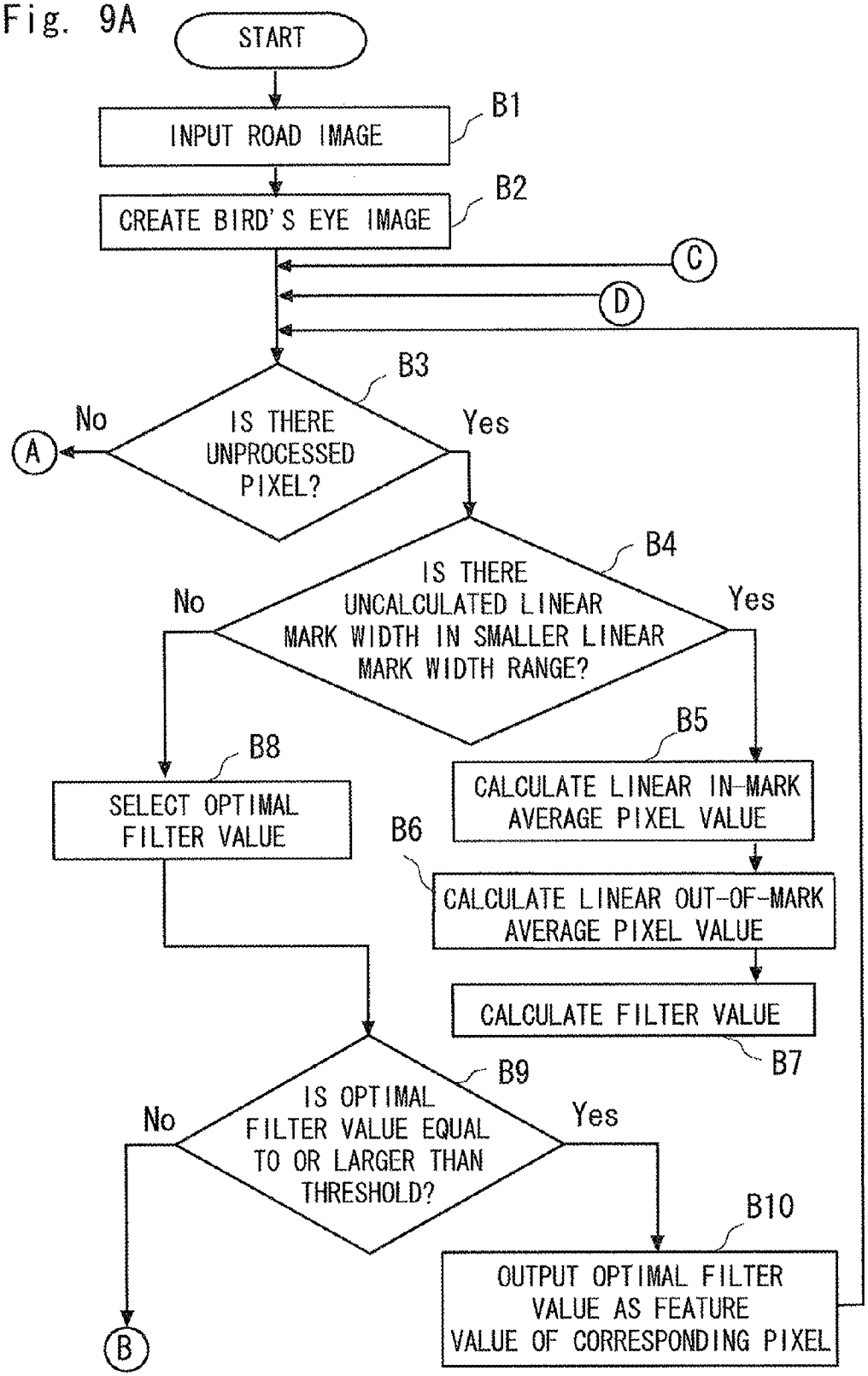
FIG. 9A is a flowchart showing an operation of the linear mark detection system according to the second exemplary embodiment.
Figure 9B:
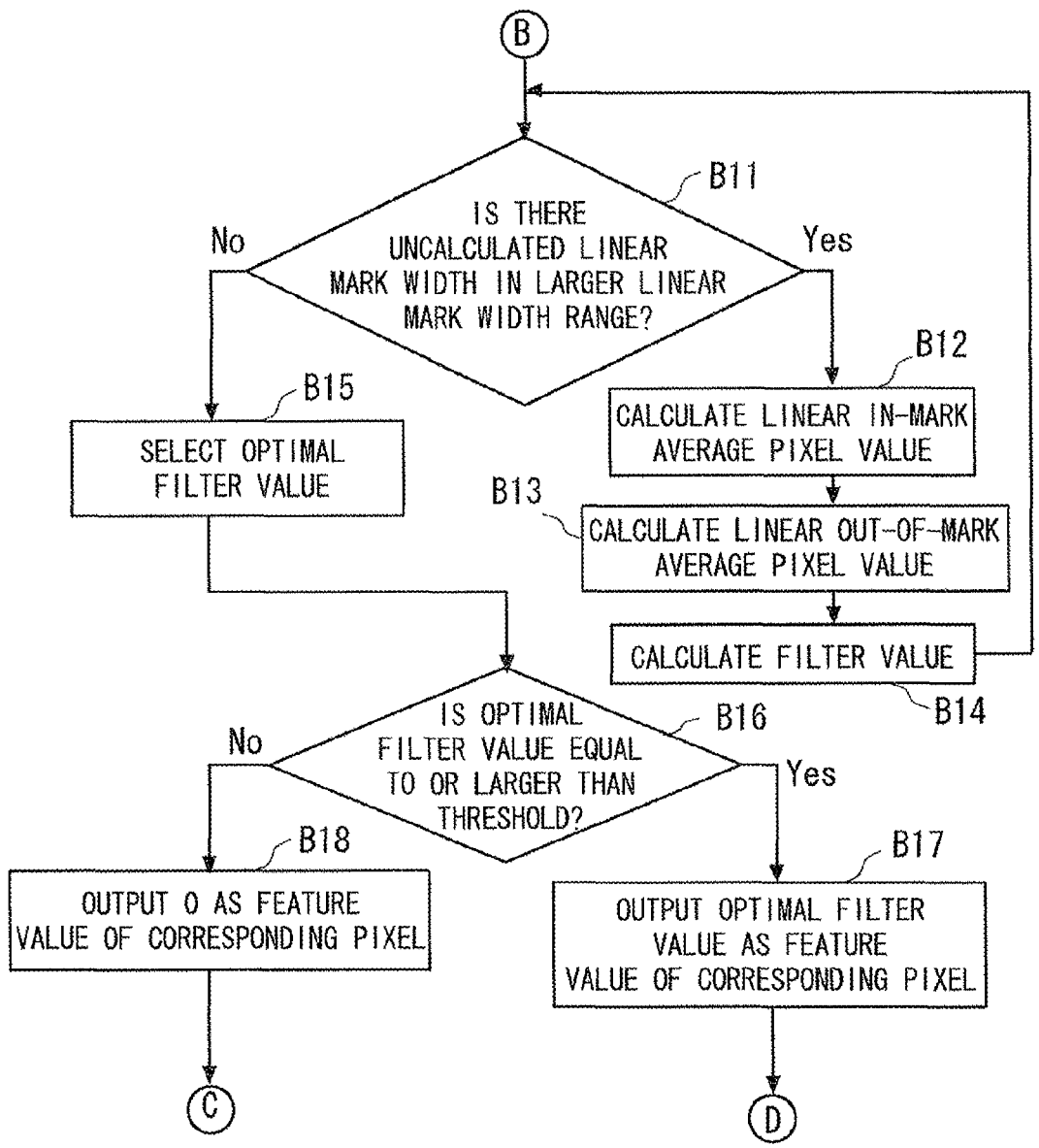
FIG. 9B is a flowchart showing an operation of the linear mark detection system according to the second exemplary embodiment.
Figure 9C:
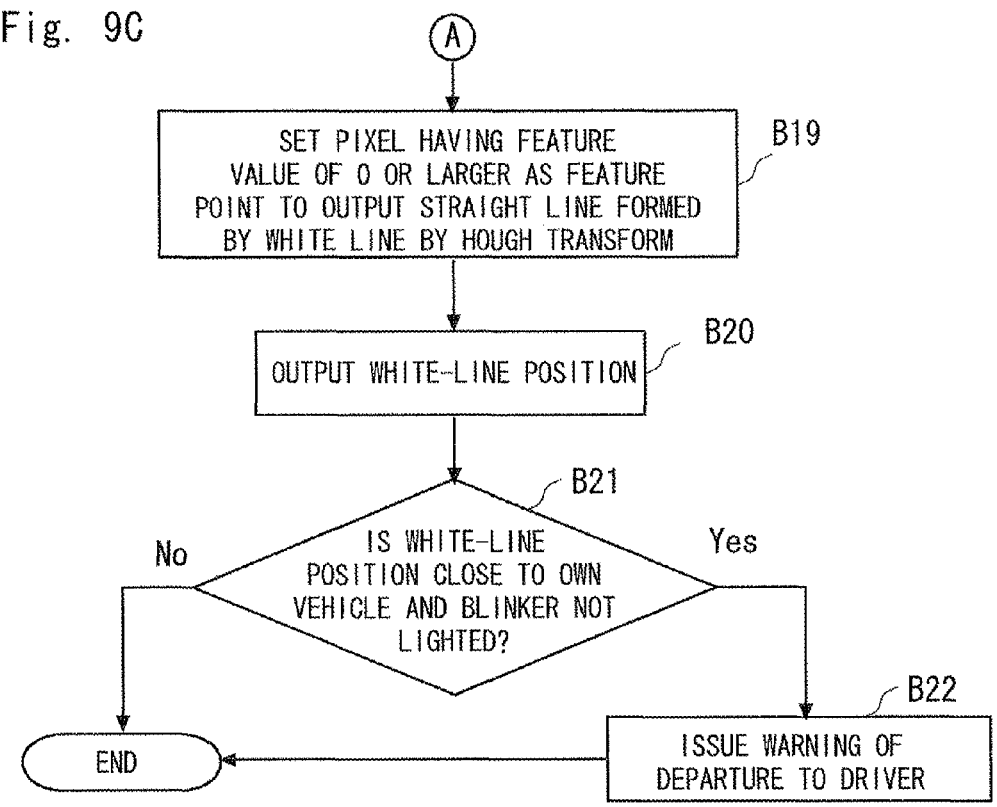
FIG. 9C is a flowchart showing an operation of the linear mark detection system according to the second exemplary embodiment.

Subsequently, with reference to FIGS. 8, 9A, 9B, and 9C, an operation of the linear mark detection system 100 according to this exemplary embodiment will be described. FIGS. 9A, 9B, and 9C are flowcharts each showing an operation of the linear mark detection system 100 according to this exemplary embodiment.

First, the image input apparatus 20 inputs the road image 701 that is captured (B1). The bird's eye image creation unit 108 creates the bird's eye image from the road image 701 that is input (B2).

Subsequently, the in-mark average pixel value calculation unit 102 determines whether there is an unprocessed pixel (B3). When there is an unprocessed pixel (B3: Yes), the process goes to the processing of the smaller mark width range (B4-B10). On the other hand, when there is no unprocessed pixel (B3: No), the process goes to the Hough transform processing (B19).

When there is an unprocessed pixel (B3: Yes), the linear mark detection system 100 determines if there is a linear mark width whose optimal filter value is uncalculated among the smaller linear mark width range in a pixel to be processed (B4).

When there is a linear mark width whose filter value is uncalculated in the smaller linear mark width range (B4: Yes), the in-mark average pixel value calculation unit 102 computes the in-mark average pixel value regarding the pixel in the linear mark width range (B5). Further, the out-of-mark average pixel value calculation unit 103 computes the out-of-mark average pixel value regarding this pixel in the linear mark width range (B6). Further, the filter value calculation unit 104 computes a filter value from the in-mark average pixel value and the out-of-mark average pixel value (B7).

When there is no more linear mark width whose filter value is uncalculated in the smaller linear mark width range (B4: No), the filter value threshold processing unit 106 selects the optimal filter value, e.g., the filter value having the maximum value, from the filter values in the smaller linear mark width range (B8).

After the selection of the optimal filter value in the smaller linear mark width range (B8) is ended, the filter value threshold processing unit 106 compares the optimal filter value that is selected with a threshold (B9). When the optimal filter value is equal to or larger than the threshold (B9: Yes), the feature value output unit 107 outputs the optimal filter value to the Hough transformer 110 as the feature value of the pixel (B10).

When the optimal filter value is smaller than the threshold (B9: No), the process goes to the processing of the larger mark width range (B11-B18).

When there is a linear mark width whose filter value is uncalculated in the larger linear mark width range (B11: Yes), the in-mark average pixel value calculation unit 102 computes the in-mark average pixel value regarding this pixel in the linear mark width range (B12). Further, the out-of-mark average pixel value calculation unit 103 computes the out-of-mark average pixel value regarding this pixel in the linear mark width range (B13). Further, the filter value calculation unit 104 computes a filter value from the in-mark average pixel value and the out-of-mark average pixel value (B14).

When there is no more linear mark width whose filter value is uncalculated in the larger linear mark width range (B11: No), the filter value threshold processing unit 106 selects the optimal filter value (e.g., the filter value having the largest value) from the filter values in the larger linear mark width range (B15).

After the selection of the optimal filter value in the larger linear mark width range (B8) is ended, the filter value threshold processing unit 106 compares the optimal filter value that is selected with the threshold (B16). When the optimal filter value is equal to or larger than the threshold (B16: Yes), the feature value output unit 107 outputs the optimal filter value to the Hough transformer 110 as the feature value of this pixel (B17). On the other hand, when the optimal filter value is smaller than the threshold (B176: Yes), the feature value output unit 107 sets the feature value of the pixel to 0 and outputs this value to the Hough transformer 110 (B18).

When processing of all the pixels is ended (B3: No), the Hough transformer 110 sets, for the image created by the bird's eye image creation unit 108, the pixel to the feature point when the feature value is larger than 0. The Hough transformer 110 then detects the straight line formed by the white line 703 using the feature point (B19).

Subsequently, the mark position output unit 111 outputs the position of the straight line detected by the Hough transformer 110 to the lane departure warning device 30 as the mark position of the white line 703 (B20).

When the own vehicle 601 is close to the mark position of the white line 703 that is detected and a blinker is not lighted (B21: Yes), the lane departure warning device 30 issues a warning of the lane departure to a driver by warning sound or the like (B22). After the warning, the lane departure warning device 30 ends the processing.

On the other hand, when the own vehicle 601 is not close to the mark position of the white line 703 that is detected and the blinker is lighted, the lane departure warning device 30 ends the processing (B21: No).

While the processing of B1-B20 stated above is achieved by causing a CPU to execute a computer program, it is not limited to this example. For example, the processing may be achieved by hardware performing this processing.

Next, effects of the linear mark detection system according to this exemplary embodiment and the drive assist system including the linear mark detection system will be described. The linear mark detection system according to this exemplary embodiment is able to operate in conjunction with the lane departure warning device 30. Accordingly, it is possible to perform drive assist of a driver using information of the lane line detected by the linear mark detection system.

Note that the present invention is not limited to the exemplary embodiments stated above, but may be changed as appropriate without departing from the spirit of the present invention.

Figure 10:
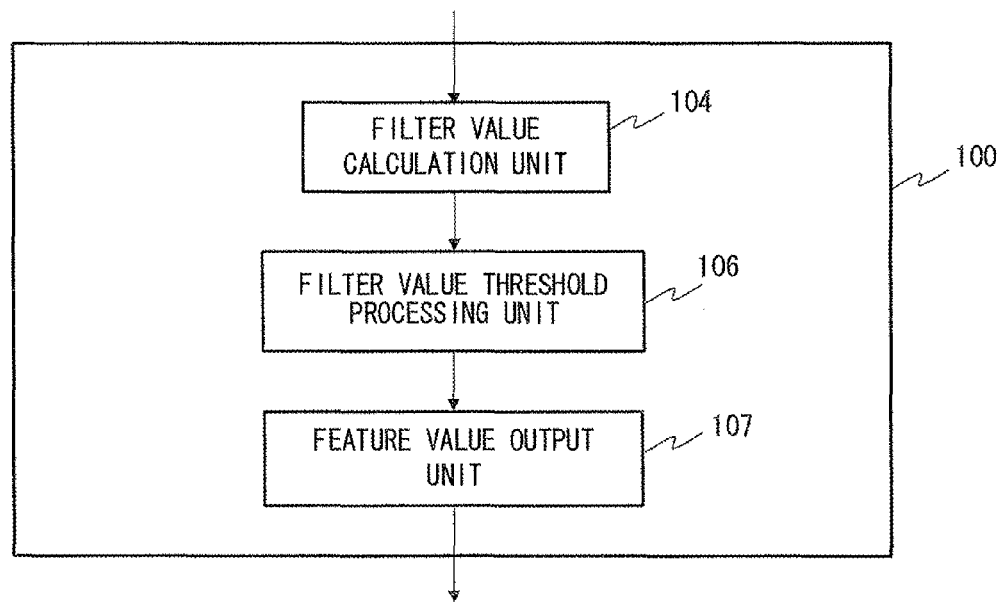
FIG. 10 is a block diagram showing a whole configuration of the linear mark detection system according to the first exemplary embodiment.
Figure 11:
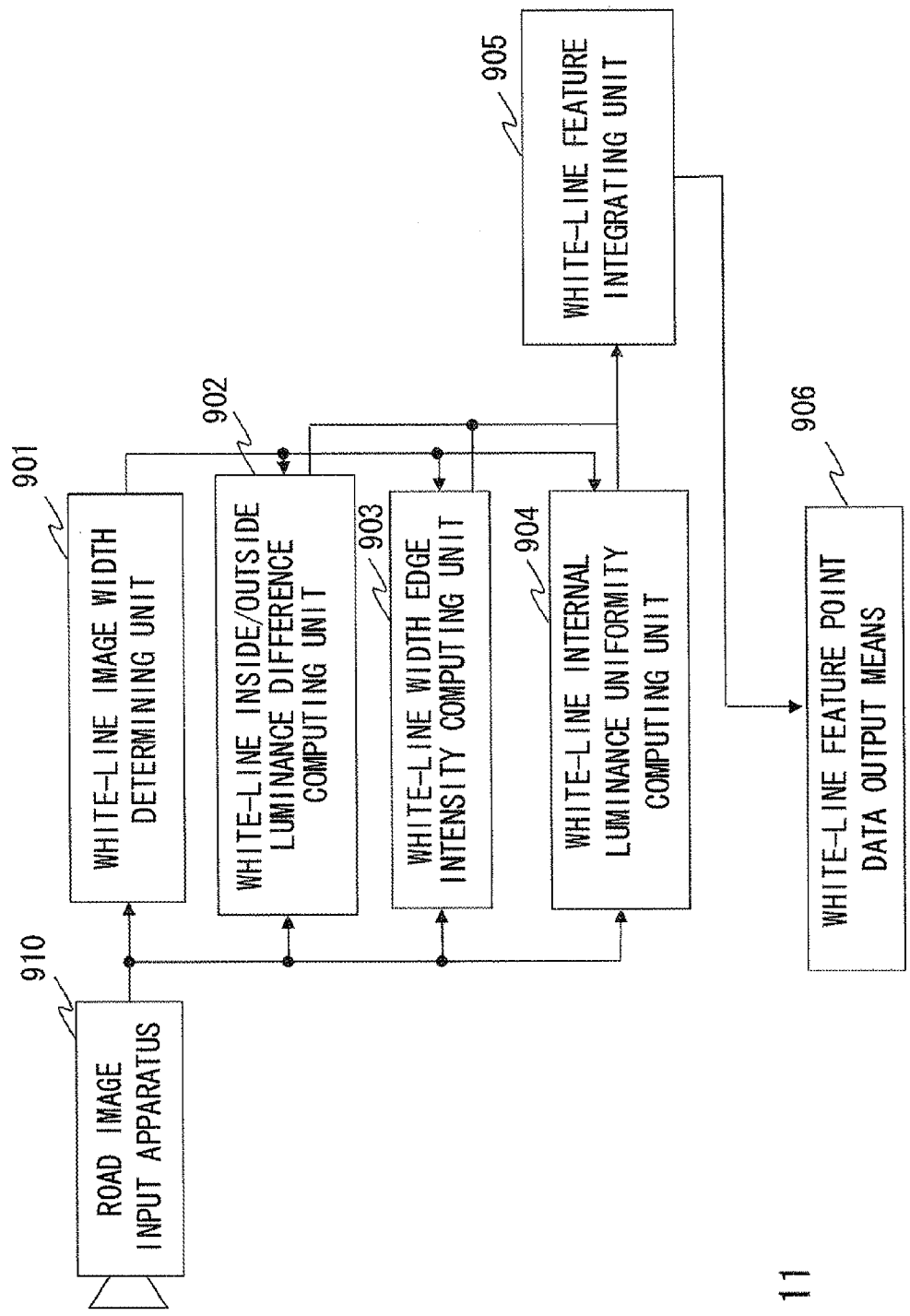
FIG. 11 is a block diagram showing a whole configuration of a linear mark detection system according to PTL 1.

Incidentally, FIG. 10 shows a minimum configuration of the linear mark detection system according to the first exemplary embodiment of the present invention. The linear mark detection system 100 shown in FIG. 10 includes a filter value calculation unit 104, a filter value threshold processing unit 106, and a feature value output unit 107.

The filter value calculation unit 104 is a unit for calculating, for each pixel of an image, filter values corresponding to each of the plurality of linear mark widths using pixel values inside and outside the linear mark. The filter value threshold processing unit 106 is a processing unit that selects the most suitable value from the filter values corresponding to each of the plurality of linear mark widths as a feature value. The feature value output unit 107 is a processing unit for outputting, for each pixel of an image, the feature value computed by the filter value threshold processing unit 106 as a feature value corresponding to the linear mark.

Also in this configuration, the linear mark detection system 100 assumes a plurality of linear mark widths to compute the feature value of each pixel. Accordingly, the linear mark detection system 100 is able to detect a linear mark having different widths.

While a part or all of the exemplary embodiments may be described as shown in the following Supplementary Notes, it is not limited to the following description.

(Supplementary Note 1)

A linear mark detection system comprising:

filter value calculation means for calculating, for each pixel of an image, filter values corresponding to each of a plurality of linear mark widths using pixel values inside and outside a linear mark;

filter value threshold processing means for setting a most suitable value to a feature value from the filter values corresponding to each of the plurality of linear mark widths; and feature value output means for outputting, for each pixel of the image, the feature value as a feature value corresponding to the linear mark.

(Supplementary Note 2)

The linear mark detection system according to Supplementary Note 1, comprising:

linear mark width range group setting means for setting a plurality of ranges in which the plurality of linear mark widths are formed in groups; and filter value selection means for selecting an optimal filter value for each of the ranges from the filter values corresponding to each of the plurality of linear mark widths, wherein the filter value threshold processing means sets the optimal filter value selected in the range corresponding to the linear mark width that is smallest among the optimal filter values that are equal to or larger than a threshold to the feature value.

(Supplementary Note 3)

The linear mark detection system according to Supplementary Note 1 or 2, comprising:

in-mark pixel value calculation means for assuming, for each pixel of the image, that the pixel is in one end of right and left ends of the linear mark, and assuming the plurality of linear mark widths from the pixel to compute an in-mark average pixel value which is an average value of pixel values of pixels in each linear mark width; and out-of-mark pixel value calculation means for computing an out-of-mark average pixel value which is an average value of pixel values of pixels in right and left regions of the range of each linear mark width used by the in-mark filter operation processing means, wherein the filter value calculation means computes the filter value by an operation value which is computed from the in-mark average pixel value and the out-of-mark average pixel value.

(Supplementary Note 4)

The linear mark detection system according to Supplementary Note 3, further comprising:

mark end gradient value calculation means for computing gradient values of pixels in both ends of the linear mark; and in-mark uniformity calculation means for computing uniformity of pixel values in the linear mark, wherein the filter value calculation means computes the filter value using the operation value computed using the in-mark average pixel value and the out-of-mark average pixel value, the gradient values, and the uniformity.

(Supplementary Note 5)

The linear mark detection system according to any one of Supplementary Notes 2 to 4, wherein the filter value threshold processing means compares the optimal filter values with the threshold from the optimal filter value which belongs to a smallest range of the range group in order, interrupts the comparison when the optimal filter value exceeds the threshold, and sets the optimal filter value to the feature value corresponding to a pixel to be processed.

(Supplementary Note 6)

The linear mark detection system according to any one of Supplementary Notes 1 to 5, further comprising linear mark position detection means for setting a pixel of which the feature value is equal to or larger than the threshold in the image to a linear mark feature point, to detect one of a straight line and a curved line formed by the linear mark feature point.

(Supplementary Note 7)

The linear mark detection system according to any one of Supplementary Notes 1 to 6, wherein the image is one of a road image captured by an in-vehicle camera and a bird's eye image created from the road image, and the linear mark is a lane line on a road surface.

(Supplementary Note 8)

A drive assist system comprising:

the linear mark detection system according to Supplementary Note 7; and a drive assist device for assisting driving by a driver using at least one of a position and type information of the lane line detected by the linear mark detection system.

(Supplementary Note 9)

A linear mark detection method comprising:

calculating, for each pixel of an image, filter values corresponding to each of a plurality of linear mark widths using pixel values inside and outside a linear mark;

setting a most suitable value to a feature value from the filter values corresponding to each of the plurality of linear mark widths; and outputting, for each pixel of the image, the feature value as a feature value corresponding to the linear mark.

(Supplementary Note 10)

The linear mark detection method according to Supplementary Note 9, comprising:

setting a plurality of ranges in which the plurality of linear mark widths are formed in groups; and selecting an optimal filter value for each of the ranges from the filter values corresponding to each of the plurality of linear mark widths, wherein, in the processing of selecting the most suitable value as the feature value, the optimal filter value selected in the range corresponding to the linear mark width that is smallest among the optimal filter values that are equal to or larger than a threshold is set to the feature value.

(Supplementary Note 11)

The linear mark detection method according to Supplementary Note 9 or 10, comprising:

assuming, for each pixel of the image, that the pixel is in one end of right and left ends of the linear mark, and assuming the plurality of linear mark widths from the pixel to compute an in-mark average pixel value which is an average value of pixel values of pixels in each linear mark width; and computing an out-of-mark average pixel value which is an average value of pixel values of pixels in right and left regions of the range of each linear mark width used by the in-mark filter operation processing means, wherein, in the processing of calculating the filter value, an operation value which is computed from the in-mark average pixel value and the out-of-mark average pixel value is set to the filter value.

(Supplementary Note 12)

The linear mark detection method according to Supplementary Note 11, further comprising:

computing gradient values of pixels in both ends of the linear mark; and computing uniformity of pixel values in the linear mark, wherein, in the processing of calculating the filter value, the filter value is computed using the operation value computed using the in-mark average pixel value and the out-of-mark average pixel value, the gradient values, and the uniformity.

(Supplementary Note 13)

The linear mark detection method according to any one of Supplementary Notes 10 to 12, wherein, in the processing of selecting the most suitable value as the feature value, the optimal filter values are compared with the threshold in order from the optimal filter value which belongs to a smallest range of the range group, the comparison is interrupted when the optimal filter value exceeds the threshold, and the optimal filter value is set to the feature value corresponding to a pixel to be processed.

(Supplementary Note 14)

The linear mark detection method according to any one of Supplementary Notes 9 to 13, further comprising setting a pixel of which the feature value is equal to or larger than the threshold in the image to a linear mark feature point, to detect one of a straight line and a curved line formed by the linear mark feature point.

(Supplementary Note 15)

The linear mark detection method according to any one of Supplementary Notes 9 to 14, wherein the image is one of a road image captured by an in-vehicle camera and a bird's eye image created from the road image, and the linear mark is a lane line on a road surface.

(Supplementary Note 16)

A non-transitory computer readable medium storing a program for causing a computer to execute detection processing to detect a linear mark, wherein the detection processing comprises:

calculating, for each pixel of an image, filter values corresponding to each of a plurality of linear mark widths using pixel values inside and outside a linear mark;

setting a most suitable value to a feature value from the filter values corresponding to each of the plurality of linear mark widths; and outputting, for each pixel of the image, the feature value as a feature value corresponding to the linear mark.

(Supplementary Note 17)

The non-transitory computer readable medium storing the linear mark detection program according to Supplementary Note 16, wherein the detection processing comprises:

setting a plurality of ranges in which the plurality of linear mark widths are formed in groups; and selecting an optimal filter value for each of the ranges from the filter values corresponding to each of the plurality of linear mark widths, wherein, in the processing of selecting the most suitable value as the feature value, the optimal filter value selected in the range corresponding to the linear mark width that is smallest among the optimal filter values that are equal to or larger than a threshold is set to the feature value.

(Supplementary Note 18)

The non-transitory computer readable medium storing the linear mark detection program according to Supplementary Note 16 or 17, wherein the detection processing comprises:

assuming, for each pixel of the image, that the pixel is in one end of right and left ends of the linear mark, and assuming the plurality of linear mark widths from the pixel to compute an in-mark average pixel value which is an average value of pixel values of pixels in each linear mark width; and computing an out-of-mark average pixel value which is an average value of pixel values of pixels in right and left regions of the range of each linear mark width used by the in-mark filter operation processing means, wherein, in the processing of calculating the filter value, an operation value which is computed from the in-mark average pixel value and the out-of-mark average pixel value is set to the filter value.

(Supplementary Note 19)

The non-transitory computer readable medium storing the linear mark detection program according to Supplementary Note 18, wherein the detection processing comprises:

computing gradient values of pixels in both ends of the linear mark; and computing uniformity of pixel values in the linear mark, wherein, in the processing of calculating the filter value, the filter value is computed using the operation value computed using the in-mark average pixel value and the out-of-mark average pixel value, the gradient values, and the uniformity.

(Supplementary Note 20)

The non-transitory computer readable medium storing the linear mark detection program according to any one of Supplementary Notes 17 to 19, wherein, in the processing of selecting the most suitable value as the feature value, the optimal filter values are compared with the threshold in order from the optimal filter value which belongs to a smallest range of the range group, the comparison is interrupted when the optimal filter value exceeds the threshold, and the optimal filter value is set to the feature value corresponding to a pixel to be processed.

(Supplementary Note 21)

The non-transitory computer readable medium storing the linear mark detection program according to any one of Supplementary Notes 16 to 20, further comprising setting a pixel of which the feature value is equal to or larger than the threshold in the image to a linear mark feature point, to detect one of a straight line and a curved line formed by the linear mark feature point.

(Supplementary Note 22)

The non-transitory computer readable medium storing the linear mark detection program according to any one of Supplementary Notes 16 to 21, wherein the image is one of a road image captured by an in-vehicle camera and a bird's eye image created from the road image, and the linear mark is a lane line on a road surface.

This application claims the benefit of priority, and incorporates herein by reference in its entirety, the following Japanese Patent Application No. 2010-066580 filed on Mar. 23, 2010.

INDUSTRIAL APPLICABILITY

The present invention is applicable to detection of a linear mark from an image captured by a camera, for example. In particular, the present invention is applicable to detection of a white line which is a kind of a lane line from a road image captured by a camera.

REFERENCE SIGNS LIST

10 COMPUTER
100 LINEAR MARK DETECTION SYSTEM
101 MARK WIDTH GROUP SETTING UNIT
102 IN-MARK AVERAGE PIXEL VALUE CALCULATION UNIT
103 OUT-OF-MARK AVERAGE PIXEL VALUE CALCULATION UNIT
104 FILTER VALUE CALCULATION UNIT
105 FILTER VALUE SELECTION UNIT
106 FILTER VALUE THRESHOLD PROCESSING UNIT
107 FEATURE VALUE OUTPUT UNIT
108 BIRD'S EYE IMAGE CREATION UNIT
109 LARGE/SMALL MARK WIDTH RANGE GROUP SETTING UNIT
110 HOUGH TRANSFORMER
111 MARK POSITION OUTPUT UNIT
130 MAIN MEMORY
140 CPU
150 SCSI CONTROLLER
160 HDD
20 IMAGE INPUT APPARATUS
30 LANE DEPARTURE WARNING DEVICE

The invention claimed is:

1. A linear mark detection system comprising:

a linear mark width range group setting unit that sets a plurality of ranges in which a plurality of linear mark widths are formed in groups;

a filter value calculation unit that calculates, for each pixel of an image, a plurality of filter values corresponding to each of a plurality of linear mark widths in the respective ranges using pixel values inside and outside a linear mark;

a filter value selection unit that selects one filter value for each of the ranges from the filter values calculated by each of the plurality of linear mark widths;

a filter value threshold processing unit that sets the one selected filter value out of a plurality of selected filter values to a feature value, the selected filter values being selected by the filter value selection unit; and a feature value output unit that outputs, for each pixel of the image, the feature value as a feature value corresponding to the linear mark, wherein the filter value threshold processing unit sets the one selected filter value selected in the range corresponding to the linear mark width that is smallest among the plurality of selected filter values that are equal to or larger than a threshold to the feature value.

2. The linear mark detection system according to claim 1, comprising:
an in-mark pixel value calculation unit that assumes, for each pixel of the image, that the pixel is in one end of right and left ends of the linear mark, and assuming the plurality of linear mark widths from the pixel to compute an in-mark average pixel value which is an average value of pixel values of pixels in each linear mark width; and
an out-of-mark pixel value calculation unit that computes an out-of-mark average pixel value which is an average value of pixel values of pixels in right and left regions of the range of each linear mark width used by the in-mark pixel value calculation unit,
wherein the filter value calculation unit computes the filter value by an operation value which is computed from the in-mark average pixel value and the out-of-mark average pixel value.

3. The linear mark detection system according to claim 2, further comprising:
a mark end gradient value calculation unit that computes gradient values of pixels in both ends of the linear mark; and
an in-mark uniformity calculation unit that computes uniformity of pixel values in the linear mark,
wherein the filter value calculation unit computes the filter value using the operation value computed using the in-mark average pixel value and the out-of-mark average pixel value, the gradient values, and the uniformity.

4. The linear mark detection system according to claim 1, wherein the filter value threshold processing unit compares the optimal filter values with the threshold in order from the optimal filter value which belongs to a smallest range of the range group, interrupts the comparison when the optimal filter value exceeds the threshold, and sets the optimal filter value to the feature value corresponding to a pixel to be processed.

5. The linear mark detection system according to claim 1, further comprising a linear mark position detection unit that sets a pixel of which the feature value is equal to or larger than the threshold in the image to a linear mark feature point, to detect one of a straight line and a curved line that the linear mark feature point belongs to.

6. The linear mark detection system according to claim 1, wherein the image is one of a road image captured by an in-vehicle camera and a bird's eye image created from the road image, and the linear mark is a lane line on a road surface.

7. A drive assist system comprising:
the linear mark detection system according to claim 6; and
a drive assist device that assists driving by a driver using at least one of a position and type information of the lane line detected by the linear mark detection system.

8. A linear mark detection method comprising:
setting a plurality of ranges in which the plurality of linear mark widths are formed in groups;
calculating, for each pixel of an image, a plurality of filter values corresponding to each of a plurality of linear mark widths in the respective ranges using pixel values inside and outside a linear mark;
selecting one filter value for each of the ranges from the filter values calculated by each of the plurality of linear mark widths;
setting the one selected filter value out of a plurality of selected filter values to a feature value, wherein the one selected filter value is selected in the range corresponding to the linear mark width that is smallest among the plurality of selected filter values that are equal to or larger than a threshold; and
outputting, for each pixel of the image, the feature value as a feature value corresponding to the linear mark.

9. A non-transitory computer readable medium storing a program that causes a computer to execute detection processing to detect a linear mark, wherein
the detection processing comprises processing of:
setting a plurality of ranges in which the plurality of linear mark widths are formed in groups;
calculating, for each pixel of an image, a plurality of filter values corresponding to each of a plurality of linear mark widths in the respective ranges using pixel values inside and outside the linear mark;
selecting one filter value for each of the ranges from the filter values calculated by each of the plurality of linear mark widths;
setting the one selected filter value out of a plurality of selected filter values to a feature value, wherein the one selected filter value is selected in the range corresponding to the linear mark width that is smallest among the plurality of selected filter values that are equal to or larger than a threshold; and
outputting, for each pixel of the image, the feature value as a feature value corresponding to the linear mark.

* * * * *